Aug. 18, 1942.        J. MAGNUSSON        2,293,553
CONTAINER HANDLING AND REGISTERING APPARATUS
Filed July 30, 1940        3 Sheets-Sheet 2
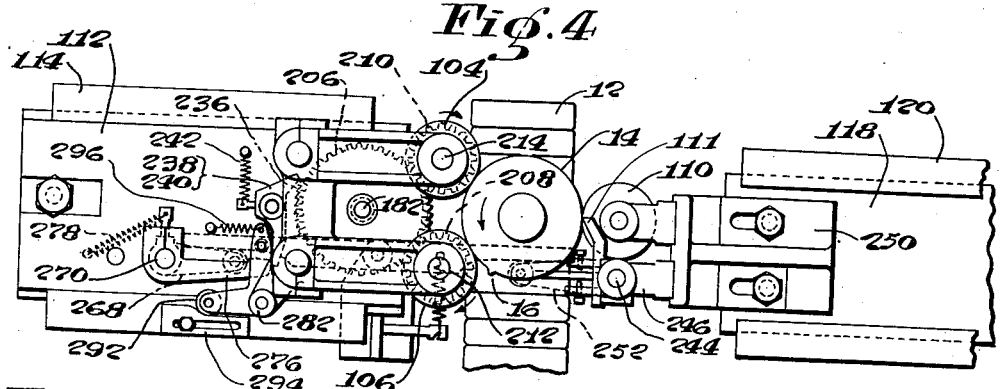
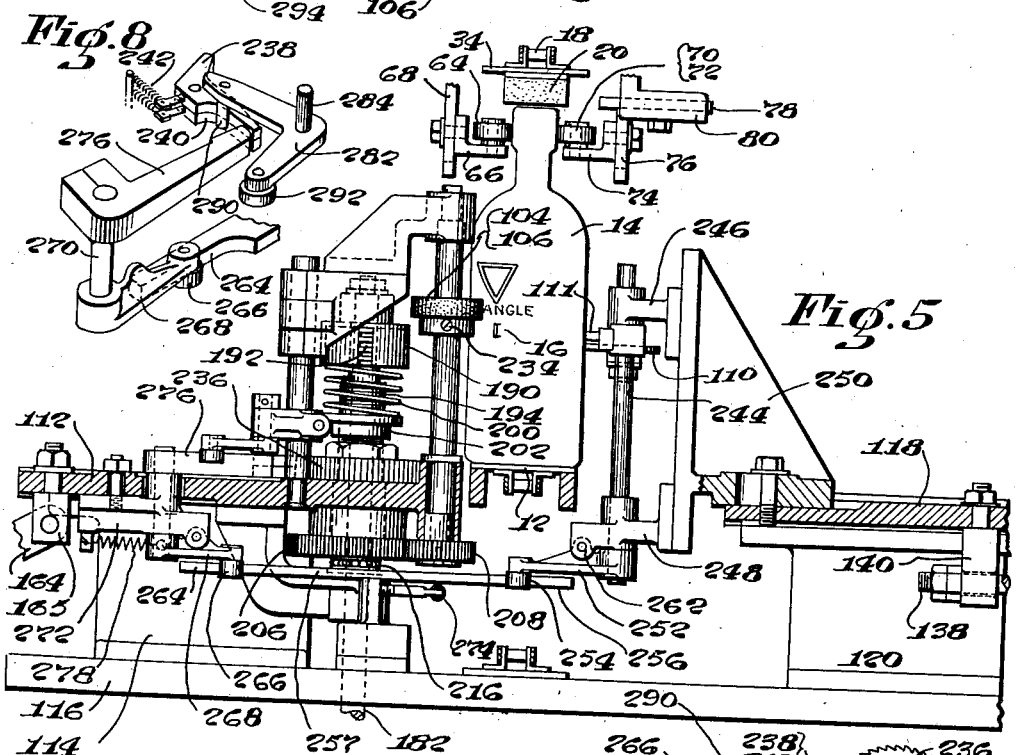
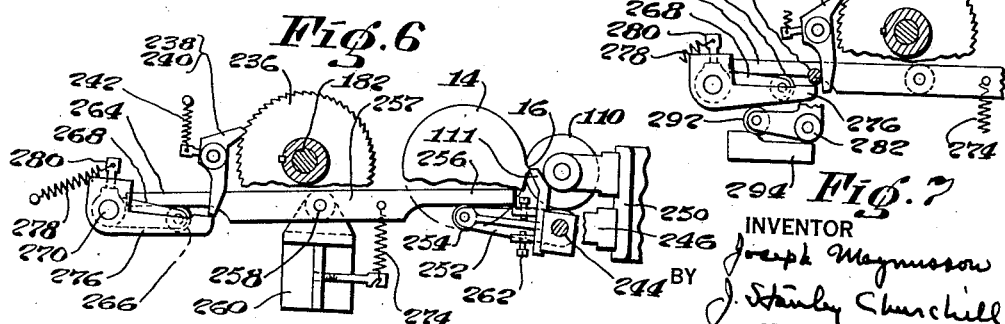
INVENTOR
Joseph Magnusson
BY
J. Stanley Churchill
ATTORNEY Aug. 18, 1942.         J. MAGNUSSON         2,293,553
CONTAINER HANDLING AND REGISTERING APPARATUS
Filed July 30, 1940          3 Sheets-Sheet 3
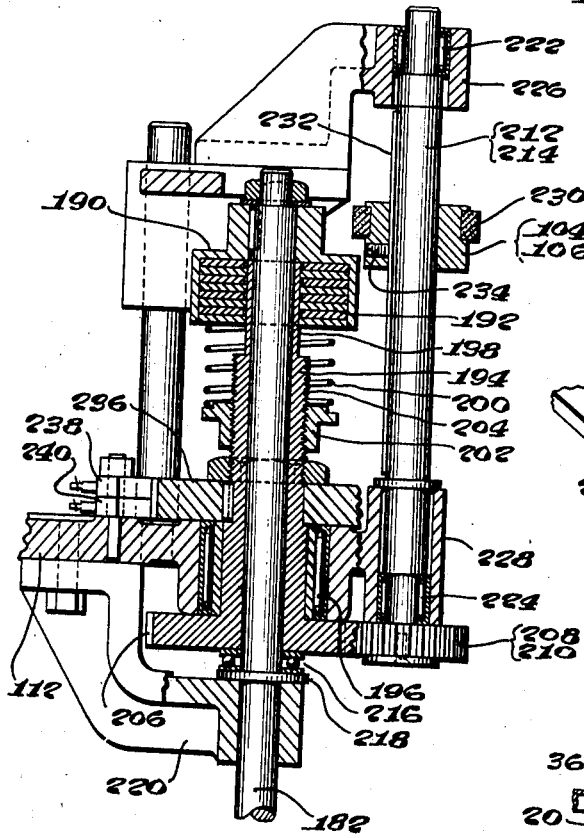
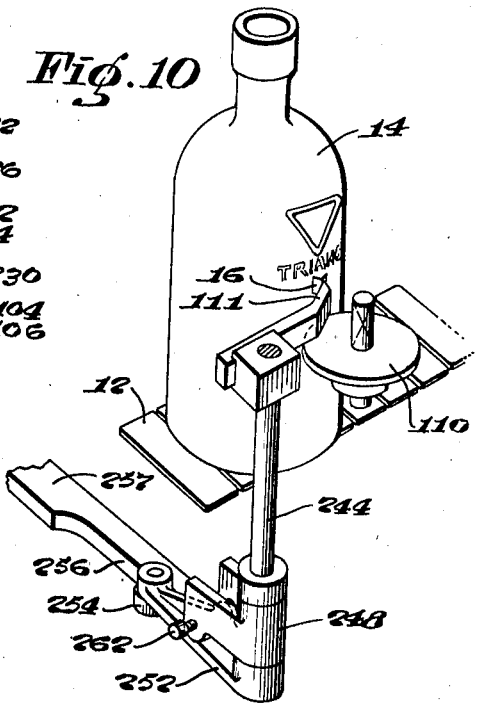
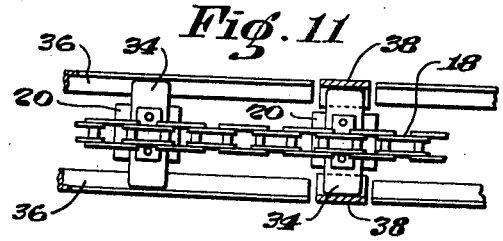
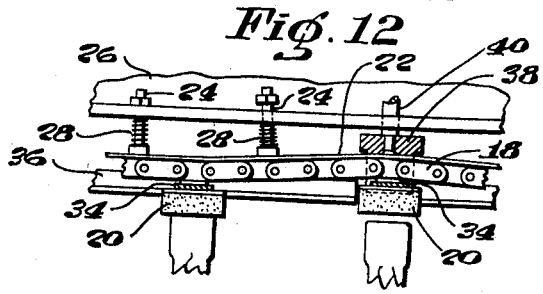
INVENTOR
Joseph Magnusson
BY J. Stanley Churchill
ATTORNEY Patented Aug. 18, 1942

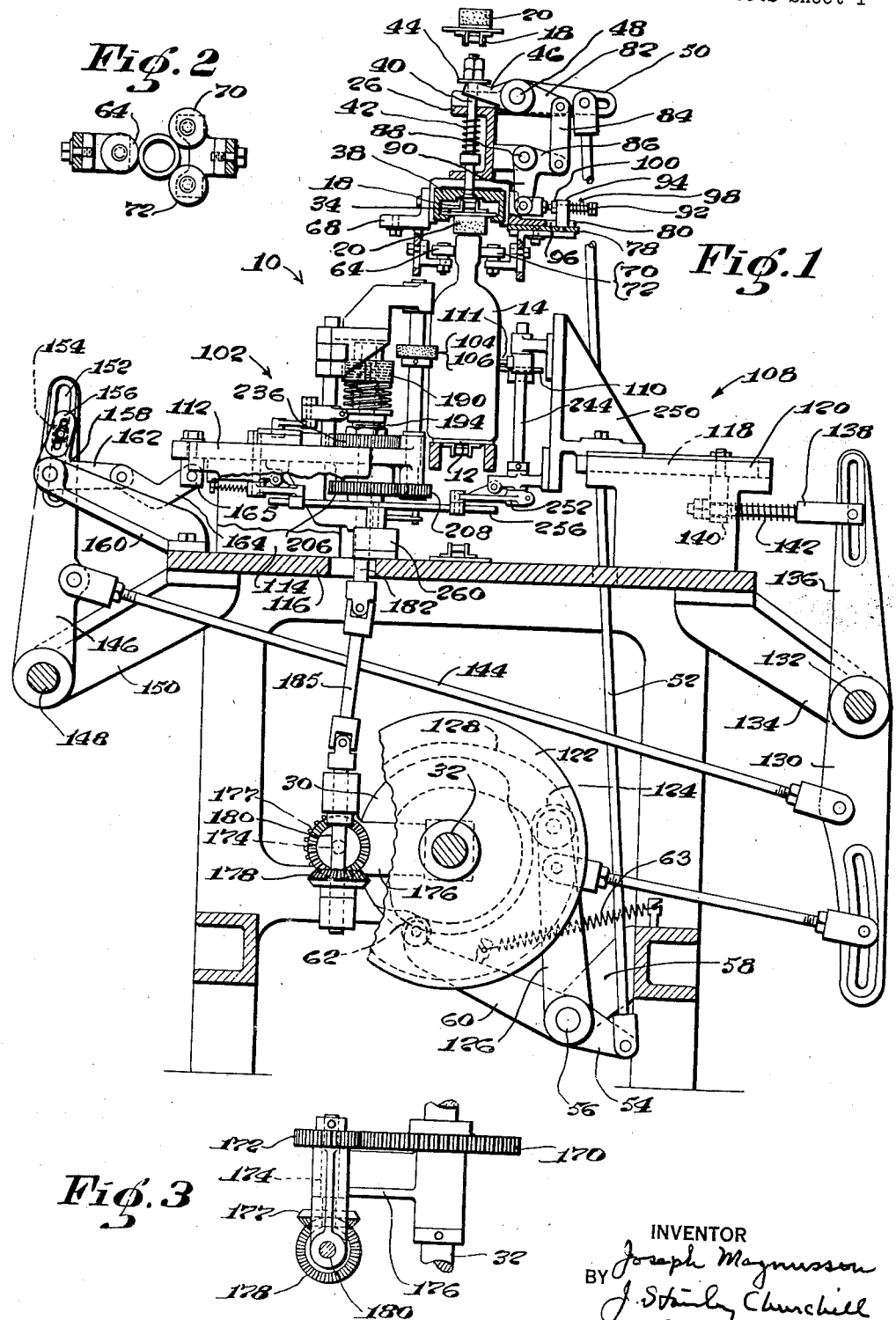

2,293,553

UNITED STATES PATENT OFFICE 2,293,553

CONTAINER HANDLING AND REGISTERING APPARATUS

Joseph Magnusson, Wollaston, Mass., assignor to Pneumatic Scale Corporation, Limited, Quincy, Mass., a corporation of Massachusetts Application July 30, 1940, Serial No. 348,535

6 Claims. (Cl. 198—33)

This invention relates to container handling and registering apparatus.

The object of the invention is to provide a novel and highly efficient apparatus for handling containers, such as bottles, of the type having letters or characters formed in the body portion thereof, such as raised letters or characters molded in the glass of bottles, and for registering the containers with respect to the conveying portion of the apparatus, to the end that subsequent operations, such as the labeling of the bottle or container, may be accomplished with the application of the label to predetermined desired portions of the body of the bottle or container. The invention contemplates container handling and registering apparatus which is positive in operation and lends itself to operation upon various types of container or bottles having letters or configurations formed on the body thereof of various sizes, styles and outlines.

With this general object in view and such others as may hereinafter appear, the invention consists in the container handling and registering apparatus and in the various structures, arrangements and combinations of parts hereinafter described and particularly defined in the claims at the end of this specification.

In the drawings illustrating the preferred embodiment of the invention, Fig. 1 is an end view, partly in cross-section, of a sufficient portion of a labeling machine embodying the present invention to enable it to be understood; Fig. 2 is a plan view detail of mechanism for supporting and aligning the upper portion of the container; Fig. 3 is a plan view detail of a portion of the driving mechanism shown in Fig. 1; Figs. 4 and 5 are plan and side elevations respectively of the registering device shown in Fig. 1; Figs. 6 and 7 are detail plan views in different positions of operation of portions of the registering apparatus shown in Figs. 4 and 5; Fig. 8 is a perspective view of resetting mechanism, to be referred to; Fig. 9 is an enlarged cross-sectional view of a portion of the driving mechanism forming part of the present registering apparatus; Fig. 10 is a perspective view of a container showing a detecting finger in operative engagement therewith; Figs. 11 and 12 are detail views in plan and side elevation respectively of the upper supporting belt, to be referred to; and Fig. 13 is an enlarged detail plan view showing the construction of the pawls for engaging the driving mechanism shown in Fig. 9.

In general, the invention contemplates handling and registering apparatus in which provision is made for conveying a series of containers which for convenience of description will be hereinafter referred to as bottles, and for registering successive bottles in predetermined relation to the conveyer so that when the line of bottles is conveyed to subsequent instrumentalities, such as labeling mechanism, the application of the label may be effected at predetermined portions of the body of the bottle. The invention, in its preferred form, is designed for operation upon bottles of substantially cylindrical shape having raised letters or characters formed on the body thereof, and contemplates mechanism for cooperating with successive bottles as they are being conveyed for detecting the raised lettering or other characters on the body of the bottle and for registering such portion of the bottle in definite position with respect to the conveyer, so that as the bottles are conveyed to subsequent instrumentalities, additional operations, such as labeling operations may be effected upon desired predetermined portions of the body of the bottle. To this end the apparatus is provided with feeling mechanism designed to detect said raised portions of the bottle and also with mechanism for rotating the bottles until such feeling mechanism indicates that the raised portions of the bottle have assumed their predetermined position with relation to the conveyer, whereupon provision is made for discontinuing the rotation of the bottle with respect to the conveyer. In the preferred embodiment of the invention, the bottle rotating means is arranged to be positively stopped immediately after detection of the raised portions on the bottle by the feeling member.

Referring now to the drawings, and particularly to Fig. 1, the registering apparatus, indicated generally at 10, is herein illustrated as embodied in a labeling machine which may be of any usual or preferred type, and which may include a movable support such as a belt 12 adapted to be intermittently moved to present the bottles 14 to successive stations for applying a label and for pressing the label against the bottle. The bottle 14 herein illustrated, is provided with a raised portion 16 which may be either a projection formed on the surface thereof or may be part of lettering molded in the bottle.

In the operation of the commercial labeling machine, the bottles 14 are fed from a source of supply onto the belt 12, without reference to the position of the lettering thereon with relation to the supporting belt 12. The bottles are preferably placed upon the intermittently movable conveyer belt 12 in predetermined spaced relation for registration with the labeling mechanisms. In accordance with the present invention, successive bottles are moved into operative position with relation to the registering apparatus 10 prior to being presented to the subsequent mechanisms for applying the label, whereby the container may be rotated on its vertical axis until it assumes a predetermined position with relation to the belt 12 so that when the containers are subsequently presented to the labeling mechanisms, they will be properly positioned with relation thereto to apply the labels in the desired location on the bottles.

Provision is also made, in the commercial labeling machines now upon the market, for supporting the top of the bottles as they are conveyed through the machine and, as herein shown, such support is effected by an endless chain 18 having a plurality of pads 20 adapted to yieldingly engage the top of the bottles and to be moved along with the bottles at the same rate of speed as the belt 12. The chain 18 is arranged to be pressed downwardly by a flexible steel strip 22 supported upon pins 24 mounted to be capable of vertical movement in a frame member 26 of the labeling machine. The strip 22 is urged into engagement with the top of the lower run of the chain 18 by springs 28 as clearly shown in Figs. 11 and 12. In order to free the bottle 14 from such pressure to permit rotation thereof, as will be described, provision is made for raising the pad 20 from engagement with its bottle and, as illustrated in Fig. 1, raising of the pad is effected through connections from a cam 30 fast upon a cam shaft 32 forming part of the labeling machine. As shown in Figs. 1, 11, 12, each pad 20 is mounted on a transverse member 34 which is guided between stationary angle rails 36. The rails 36 are open at the bottle registering station and a movable member 38 is normally disposed to form an extension of the rails 36. An elongated stud 40 connected to the movable member 38 and vertically movable in the frame member 26 is normally urged downwardly by a spring 42. The upper end of the stud 40 is provided with a washer 44 arranged to be engaged by one arm 46 of a lever pivotally mounted on a stud 48 secured in the machine frame. A second arm 50 of the lever is connected by a link 52 to one arm 54 of a cam lever rockingly mounted on a stud 56 secured in a bracket 58 attached to the machine frame. The second arm 60 of the cam lever is provided with a roller 62 which cooperates with the cam 30. A spring 63 attached to the arm 60 operates to hold the roller 62 in engagement with its cam. Thus, in operation, when the bottle is moved into operative position with relation to the registering apparatus 10, the cam 30 operates to raise the movable member 38 which engages the ends of the transverse member 34 to remove the pad 20 from engagement with the bottle and render ineffective the pressure of the flexible strip 22.

Simultaneously with the removal of the pad 20 from operative engagement with the bottle, provision is made for effecting lateral support for the upper or neck portion of the bottle. As illustrated in Figs. 1 and 2, a stationary roller 64 is arranged to bear against one side of the neck portion of the bottle. The stationary roller is carried in an angle piece 66 adjustably mounted in a stationary bracket 68. The other side of the neck portion is supported by two rollers 70, 72 rotatably mounted in an angle piece 74 which is similarly mounted for vertical adjustment in an angle bracket 76. The angle bracket 76 is attached to a carrier 78 slidingly mounted in a bracket 80 and is arranged to be reciprocated laterally to urge the rollers 70, 72 into yielding engagement with the neck portion of the bottle through connections from the pad raising mechanism, as illustrated in Fig. 1. These connections include a third arm 82 of the lever pivotally mounted at 48 which is connected by a link 84 to one arm 86 of a bell-crank rockingly mounted at 88, the second arm 90 being connected by a rod 92 to a lug 94 attached to the carrier 78. The lug 94 extends through a slot 96 provided in the bracket 80. The rod 92 is slidingly fitted in the lug 94 and a coil spring 98 on the rod 92 is arranged to urge the lug 94 against a nut 100 provided on the rod 92. In operation, when the cam 30 is operated to effect raising of the pad 20, as described, the carrier 78 is moved inwardly to present the rollers 70, 72 into engagement with the neck of the bottle, which, in cooperation with the stationary roller 64 form a three point bearing against the bottle neck to assure axial alignment of the bottle at right angles to the conveyer during the rotation thereof as will be described. The spring 98 permits yielding engagement of the rollers 70, 72 against the bottle, as clearly shown in Fig. 1.

Referring now to Figs. 1, 4 and 5, the bottle rotating and registering mechanism therein shown comprises a driving unit 102 including a pair of driven rollers 104, 106, and an opposing unit 108 including an idler roll 110 and a detecting finger 111. The driving unit 102 is mounted upon a carrier 112 arranged to be reciprocated, transversely of the container supporting belt 12, in a slide bracket 114 mounted on the platen 116 of the machine frame. The idler roll unit 108 is similarly mounted on a carrier 118 slidingly mounted in a bracket 120 attached to the platen 116.

Provision is made for simultaneously reciprocating the units 102, 108 toward and from each other to present the rollers 104, 106, and 110 into and out of operative engagement with the bottle 14 in timed relation to the intermittent movement of the belt 12. As herein shown, the reciprocation of each unit is effected through connections from a cam 122 mounted fast on the cam shaft 32 including a cam roller 124 carried by a cam lever 126 and cooperating with a cam path 128 formed in the closed cam 122. The cam lever 126 is rockingly mounted on the stud 56 and is connected to one arm 130 of a two-armed lever pivotally mounted on a stud 132 carried in a bracket 134 attached to the machine frame. In order to reciprocate the unit 108, a second arm 136 of the two-armed lever is connected by a link 138 to a depending lug 140 fixed in the carrier 118. The link 138 is slidingly extended through the lug 140 and a coil spring 142 on the link 138 permits the idler roller 110 to be yieldingly pressed into engagement with the bottle, as clearly illustrated in Fig. 1.

The driving unit 102 is arranged to be reciprocated by connections including a link 144 connecting the arm 130 to an arm 146 pivotally mounted on a stud 148 carried in a bracket 150 attached to the machine frame. The arm 146 is provided with a slotted portion 152 in which a slide block 154, carried in one arm 156 of a bellcrank 158 is arranged to be received. The bell crank 158 is rockingly mounted in a bracket 160 attached to the platen 116, and the second arm 162 of the bell-crank is connected by a link 164 to a depending lug 166 attached to the carrier 112, as shown in Fig. 1.

Provision is made for driving the rollers 104, 106 through connections from the cam shaft, 32, and as herein shown, a gear 170 fast on the cam shaft is arranged to mesh with a pinion 172 fast on a shaft 174 carried in a bracket 176, see Fig. 3. A bevel gear 177 also fast on the shaft 174 meshes with a bevel gear 178 fast on a vertical shaft 180 which is arranged to drive a spindle 182, through a universal joint connection 185 so as to permit the driving mechanism to operate during the reciprocal movement of the carrier 112.

Referring now particularly to Figs. 4 and 5, the upper end of the spindle 182 is provided with a clutch housing 190 fast thereon which forms part of a friction clutch having a plurality of disks 192 arranged to frictionally engage and drive an elongated hollow member 194 fitted over the spindle 182 and which is rotatably mounted in a roller bearing 196 carried in the carrier member 112. As best shown in Fig. 9, alternate disks 192 are arranged to grip the upper portion 198 of the member 194 and a coil spring 200 arranged to compress the disks 192 may be adjusted to effect more or less frictional pressure by rotating a nut 202 on a threaded portion 204 of the member 194. The lower end of the member 194 is provided with a gear 206 formed integrally therewith which meshes with pinions 208, 210 keyed to the lower ends of vertical shafts 212, 214 respectively upon which the rollers 104, 106, are mounted, as shown in Fig. 4. The elongated driven member 194 is supported vertically on the spindle 182 by a thrust bearing 216, and a collar 218 formed integrally with the shaft 182 is supported by a bracket 220 attached to the underside of the carrier 112. The vertical shafts 212, 214 are rotatably mounted in roller bearings 222, 224 held in suitable bearing brackets 226, 228, as best shown in Fig. 9. The rollers 104, 106 are preferably provided with rubber rings 230 for engagement with the bottle, and the rollers are arranged to be adjusted vertically on the shafts 212, 214. As shown in Fig. 9, each shaft is provided with an elongated key 232 to prevent rotation of the rolls on the shafts, and set screws 234 hold the rolls vertically on the shafts.

Referring now particularly to Figs. 4 through 8, provision is made for stopping and starting the frictionally driven member 194 to terminate the rotation of the driven rollers 104, 106, when the bottle has been rotated to a predetermined position with relation to the conveyer belt 12. As herein shown, the driven member 194 is provided with a ratchet 236 keyed thereon which is arranged to be engaged by one of a pair of pawls 238, 240 pivotally mounted in the carrier 112. As shown in detail in Fig. 13, one pawl 238 is made slightly shorter than its companion pawl 240, by a distance of one half a tooth of the ratchet, in order to permit either pawl to fall into the nearest tooth of the ratchet thereby enabling the driven unit 194 to be stopped more quickly. Each pawl is provided with a spring 242 which normally urges the pawls into operative engagement with its ratchet.

Provision is made for engaging and disengaging the pawls from the ratchet, to stop and start rotation of the driving unit and bottle rotating rollers through connections from the detecting finger 111 so as to permit rotation of the bottle to be terminated when the detecting finger is moved by the projection 16 on the bottle. The detecting finger 111 is mounted fast on a vertical shaft 244 rockingly mounted in suitable bearings 246, 248 attached to a bracket 250 mounted on the reciprocating carrier 118. The lower end of the vertical shaft 244 is provided with a lever 252 carrying a roller 254 arranged to engage one end 256 of a cam bar 257 pivotally mounted intermediate its ends on a stud 258 secured in a bracket 260 attached to the platen 116. The detecting finger 111 is free to rock in either direction between limits determined by adjustment of stop screws 262 carried in the lower bearing member 248, as shown in Figs. 5 and 6. The other end 264 of the pivotally mounted cam bar 257 is arranged to be engaged by a roller 266 carried by a lever 268 mounted fast on the lower end of a stud 270, rockingly mounted in a bracket 272 attached to the carrier 112. A spring 274 attached to the end 256 of the cam bar 257 normally urges the bar against the roller 254 to move the detecting finger into operative engagement with the bottle being rotated. The upper end of the stud 270 is provided with a latch member 276 arranged to engage the tail portions of the pawls 238, 240 to hold them out of engagement with the ratchet 236. A spring 278 attached to a stud 280 in the lever 268 is arranged to urge the latch member 276 into latching position, and also to cause the roller 266 to engage the cam bar end 264.

In the operation of the apparatus thus far described, when the opposing units 102, 108 are moved inwardly to cause the rollers 104, 106, and 110 to engage the bottle, the rollers 104, 106 are driven to rotate the bottle through the connections described. When the projection 16 on the bottle engages the detecting finger 111, the shaft 244 is rocked which rocks the cam bar 257 to move the latch out of the path of the tail portions of the pawls 238, 240 to permit them to engage the ratchet 236 to stop the driven member 194 and the rollers 104, 106. The friction clutch, including the housing 190 and the disks 192, is permitted to slip on the driven member 194 while the pawls 238, 240 are in engagement with the ratchet 236.

Provision is made for resetting the detecting mechanism and for removing the pawls 238, 240 from engagement with the ratchet upon the return movement of the driving unit 102, and as herein shown, the resetting mechanism includes a bell crank 282 pivotally mounted on a stud 284 attached to the carrier 112. One arm of the bell crank is provided with a resetting pin 290 arranged to engage the tail portions of the pawls 238, 240 to disengage the same from the ratchet and to permit the latch member 276 to fall into latching position, as shown in Figs. 4 and 7. The other arm of the bell crank 282 is provided with a cam roll 292 arranged to cooperate with a stationary cam piece 294 mounted on the slide bracket 114. A spring 296 is arranged to hold the roll against its cam. Normally when the unit 102 is in its advanced or operative position against the bottle, the roll 292 is against the low portion of the cam piece 294 to hold the resetting pin 290 out of engagement with the tail portions of the pawls. When the unit is retracted, the roll 292 rides upon the high spot of the cam piece 294, as clearly illustrated in Fig. 7, to disengage the pawls 238, 240 from the ratchet 236 and to permit the latch 276 to be moved into locking position.

Throughout the foregoing specification, and in the claims, it will be understood that wherever the term "bottle" is used, it is intended to include any type of container adapted to be rotated into a predetermined position with respect to its conveying element. It will also be understood that wherever the word "lettering" is used, it is intended to include any other projections, designs or characters formed upon the surface of the container adapted to be engaged by a detecting finger and to actuate control mechanism for positioning a container in a predetermined position with relation to its conveying element.

While the preferred embodiment of the invention has been herein illustrated and described, it will be understood that the invention may be embodied in other forms within the scope of the following claims.

Having thus described the invention, what is claimed is:

1. Bottle handling and registering apparatus having, in combination, means for conveying successive bottles having lettering formed on the surface thereof, and bottle registering mechanism for registering the bottle with the lettering disposed in predetermined position with respect to the conveying means, comprising detecting means for detecting the lettering, means for rotating the bottle, and connections between the detecting means and said bottle rotating means for terminating rotation of the bottle when the lettering is detected, and guiding means including a plurality of rollers engaging the neck portion of the bottle for assuring rotation of the bottle about a vertical axis.

2. Bottle handling and registering apparatus having, in combination, means for conveying successive bottles having lettering formed on the surface thereof, and bottle registering mechanism for registering the bottle with the lettering disposed in predetermined position with respect to the conveying means, comprising detecting means for detecting the lettering, means for rotating the bottle, and connections between the detecting means and said bottle rotating means for terminating rotation of the bottle when the lettering is detected, and guiding means including a plurality of rollers cooperating with the neck portion of the bottle for assuring rotation of the same about a vertical axis.

3. Bottle handling and registering apparatus having, in combination, means for conveying successive bottles having lettering formed on the surface thereof, and bottle registering mechanism for registering the bottle with the lettering disposed in predetermined position with respect to the conveying means, comprising detecting means for detecting the lettering, means for rotating the bottle, and connections between the detecting means and said bottle rotating means for terminating rotation of the bottle when the lettering is detected, and means engageable with the top of said bottles for clamping the latter in said registered position after the rotation thereof has been terminated.

4. Bottle handling and registering apparatus having, in combination, an intermittently operative belt for conveying successive bottles having lettering formed on the surface thereof, and bottle registering mechanism for registering the bottle with the lettering disposed in predetermined position with respect to said belt, comprising a reciprocable member having a roller adapted to engage said bottle when moved into one position of operation, a detecting finger carried by said reciprocable member and arranged to engage the surface of said bottle, an opposed reciprocable member having a pair of driven rollers engageable with said bottle to cause rotation thereof when moved into operative position therewith, means for driving said rollers, means for simultaneously reciprocating said members to move said rollers into and out of operative engagement with the bottle in timed relation to the movement of said intermittently operative belt, and mechanical connections between said detecting finger and said driving means for terminating rotation of said driven rollers when said lettering is detected, and means operable upon retracting movement of said opposed reciprocable member for again initiating rotation of said driven rollers.

5. Bottle handling and registering apparatus having, in combination, means for conveying successive bottles having lettering formed on the surface thereof, and bottle registering mechanism for registering the bottle with the lettering disposed in predetermined position with respect to the conveying means, comprising detecting means for detecting the lettering, a slide member, means for reciprocating said slide member, means for rotating the bottle including a friction drive carried by said slide member, said friction drive having a continuously rotating driving part and a driven part, means for locking said driven part against rotation while said driving part is rotating to thereby produce slippage in said friction drive, means operable by said detecting means for actuating said locking means to terminate rotation of the bottle when the lettering is detected, and means for releasing said locking means operable in response to retractive movement of said slide.

6. Bottle handling and registering apparatus, having, in combination, an intermittently operative belt for conveying successive bottles having lettering formed on the surface thereof, and bottle registering mechanism for registering a bottle with the lettering disposed in predetermined position with respect to said belt, comprising a reciprocable member having an idler roller adapted to engage said bottle when moved into one position of operation, a shaft rotatably carried by said reciprocable member, a detecting finger and an arm fixedly mounted upon said shaft, said detecting finger being arranged to have one end thereof engage the surface of said bottle, a second reciprocable member having a pair of driven rollers engageable with said bottle to cause rotation thereof when moved into operative engagement therewith, means for imparting rotation to said rollers including a friction drive having a driving part and a driven part, a ratchet fixed to said driven part, pawl means pivotally mounted upon said second reciprocable member and adapted to engage said ratchet, a rotatable shaft carried by said second reciprocable member and having a lever at one end thereof arranged to normally hold said pawl means disengaged and an arm at the opposite end thereof, a lever having its fulcrum between said two shafts and arranged to have one end thereof engaged by the arm associated with said detecting finger and its opposite end arranged to engage the arm associated with the lever normally maintaining said pawl means disengaged, whereby when said lettering is detected said detecting finger will effect a release of said pawl means and enable the same to engage said ratchet to lock said driven part against rotation and thus stop rotation of said bottle through said driving rolls, and means for simultaneously moving said reciprocable members to move said idler roller, said detecting finger and said driving rolls into and out of operative engagement with the bottle in timed relation to the movement of said intermittently operated belt.

JOSEPH MAGNUSSON.